United States Patent
Tang et al.

(10) Patent No.: US 10,833,839 B1
(45) Date of Patent: Nov. 10, 2020

(54) LOW VOLTAGE DIFFERENTIAL SIGNAL TRANSMITTER, METHOD FOR GENERATING A LOW VOLTAGE DIFFERENTIAL SIGNAL, AND DATA TRANSMISSION DEVICE

(71) Applicant: AutoChips Inc., Hefei (CN)

(72) Inventors: Wenjuan Tang, Hefei (CN); Tao Zhang, Hefei (CN)

(73) Assignee: AUTOCHIPS INC., Hefei (CN)

( * ) Notice: Subject to any disclaimer, the term of this patent is extended or adjusted under 35 U.S.C. 154(b) by 0 days.

(21) Appl. No.: 16/556,263

(22) Filed: Aug. 30, 2019

(30) Foreign Application Priority Data

May 8, 2019 (CN) .......................... 2019 1 0381532

(51) Int. Cl.
*H03D 3/24* (2006.01)
*H04L 7/033* (2006.01)
*H04L 25/02* (2006.01)
*H04L 7/00* (2006.01)

(52) U.S. Cl.
CPC .......... *H04L 7/0331* (2013.01); *H04L 7/0091* (2013.01); *H04L 25/028* (2013.01); *H04L 25/0272* (2013.01)

(58) Field of Classification Search
CPC . H04L 7/0331; H04L 7/0091; H04L 25/0272; H04L 25/028
USPC ....................................................... 375/376
See application file for complete search history.

(56) References Cited

U.S. PATENT DOCUMENTS

| | | | | |
|---|---|---|---|---|
| 6,215,816 B1* | 4/2001 | Gillespie | ................. | H04L 12/44 370/402 |
| 9,344,594 B2* | 5/2016 | Nagasaka | ............... | H04N 1/203 |
| 2010/0231742 A1* | 9/2010 | Yanada | ................ | H04N 5/2352 348/222.1 |
| 2010/0246699 A1* | 9/2010 | Moriizumi | ............ | H04L 7/0091 375/260 |
| 2014/0340132 A1* | 11/2014 | Terrovitis | .............. | H03L 7/1976 327/157 |
| 2015/0170590 A1* | 6/2015 | Ahn | ...................... | G09G 3/3614 345/96 |
| 2015/0206273 A1* | 7/2015 | Jeon | ....................... | G09G 5/008 348/521 |
| 2015/0228246 A1* | 8/2015 | Kim | ......................... | G06F 3/14 345/520 |

* cited by examiner

*Primary Examiner* — Helene E Tayong (57) ABSTRACT

The present disclosure discloses a low voltage differential signal transmitter, a method for generating a low voltage differential signal, and a data transmission device, the low voltage differential signal transmitter includes a controller and a physical layer chip connected with each other, the controller is configured to receive a first clock signal, process the first clock signal to obtain a second clock signal, read a first data signal under drive of the second clock signal, and output a third clock signal and a second data signal; the physical layer chip is configured to receive the first clock signal and the signals output by the controller, sample the third clock signal and the second data signal according to the first clock signal, and output a serial low voltage differential clock signal and a serial low voltage differential data signal.

14 Claims, 5 Drawing Sheets

LOW VOLTAGE DIFFERENTIAL SIGNAL TRANSMITTER, METHOD FOR GENERATING A LOW VOLTAGE DIFFERENTIAL SIGNAL, AND DATA TRANSMISSION DEVICE

CROSS-REFERENCE TO RELATED APPLICATIONS

This application claims priority to Chinese Patent Application No. 201910381532.7, filed on May 8, 2019, the contents of which are herein incorporated by reference in their entireties.

TECHNICAL FIELD

The present disclosure relates to the field of communication technologies, and in particular, to a low voltage differential signal transmitter, a method for generating a low voltage differential signal, and a data transmission device.

BACKGROUND

Since LVDS (Low Voltage Differential Signaling) can reduce electromagnetic radiation and improve anti-interference ability, and serial communication can save signal lines, most interfaces of LCDs (Liquid Crystal Displays) used in vehicular devices are LVDS interfaces.

A clock frequency of an LVDS interface is usually 20 MHz to 85 MHz. For signals with an output pixel clock frequency being lower than 85 MHz, single-link transmission can be used, and the transmission only requires using one clock signal plus and four data signals; for signals with an output pixel clock frequency being higher than 85 MHZ, output pixels need to be classified into odd pixels and even pixels in order, all odd pixel data is transmitted by one group of LVDS and all even pixel data is transmitted by another group of LVDS, which needs to use dual-link transmission and adopt two clock signals and eight data signals; for signals with higher display clock frequencies, such as 1080p@120 HZ, it is required to use four-link transmission, which will be expanded to four clock signals and sixteen data signals.

The inventor of the present disclosure has found in long-term research and development that: in the prior art, two phase locked loops (PLLs) are utilized to implement an LVDS interface, which utilizes a system PLL and an internal PLL of a port physical layer chip (Phy, Physical) respectively to generate clock signals; the system PLL outputs a pixel clock signal to the port physical layer chip, and the Phy chip uses its internal PLL to generate a sampling clock signal with a frequency being higher than that of the pixel clock signal; since the duty cycle of the pixel clock signal sent to the Phy chip by the system PLL is 50%, the internal PLL of the Phy chip needs to change the duty cycle of the pixel clock signal to 4/7; the pixel clock signal needs to be processed by the internal PLL, and the data signal is processed by a parallel-input serial-output module (PISO, parallel-in-serial-out) in the Phy chip, therefore, the data signal and the pixel clock signal pass different paths, so that a phase difference is prone to occur between output clock signal and data signal, resulting in poor synchronization alignment, which is mainly reflected in the poor clock offset parameters, especially the dual link, and limited following capability of the clock signal after frequency spreading due to the poor synchronization.

SUMMARY

The main problem to be solved by the present disclosure is to provide a low voltage differential signal transmitter, a method for generating a low voltage differential signal, and a data transmission device, which can ensure that data signals are synchronous to clock signals and ameliorate clock offsets.

In order to solve the above technical problem, a technical solution adopted by the present disclosure is to provide a low voltage differential signal transmitter, the low voltage differential signal transmitter comprises a controller and a physical layer chip, the controller is configured to receive a first clock signal, process the first clock signal to obtain a second clock signal, read a first data signal under drive of the second clock signal, and output a third clock signal and a second data signal; the physical layer chip is configured to receive the first clock signal, and is connected with the controller to receive the signals output by the controller; the physical layer chip is further configured to sample the third clock signal and the second data signal according to the first clock signal, and output a serial low voltage differential clock signal and a serial low voltage differential data signal.

In order to solve the above technical problem, another technical solution adopted by the present disclosure is to provide a method for generating a low voltage differential signal, the method comprises: receiving a first clock signal; processing the first clock signal to obtain a second clock signal; reading a first data signal under drive of the second clock signal; outputting a third clock signal and a second data signal; sampling the third clock signal and the second data signal according to the first clock signal; and outputting a serial low voltage differential clock signal and a serial low voltage differential data signal.

In order to solve the above technical problem, another technical solution adopted by the present disclosure is to provide a data transmission device, the data transmission device comprises a phase-locked loop, a low voltage differential signal transmitter, and a receiver; the phase-locked loop is configured to generate a first clock signal; the low voltage differential signal transmitter is connected with the phase-locked loop and includes a controller and a physical layer chip connected with each other; the controller is configured to receive the first clock signal, process the first clock signal to obtain a second clock signal, read a first data signal under drive of the second clock signal, and output a third clock signal and a second data signal; the physical layer chip is configured to receive the first clock signal and the signals output by the controller, sample the third clock signal and the second data signal according to the first clock signal, and output a serial low voltage differential clock signal and a serial low voltage differential data signal; the receiver is connected with the low voltage differential signal transmitter and configured to receive the serial low voltage differential data signal.

Through the above solutions, beneficial effects of the present disclosure are as below: a low voltage differential signal transmitter of the present disclosure comprises a controller and a physical layer chip connected with each other; a received first clock signal is processes by the controller to obtain a second clock signal, and under drive of the second clock signal, the controller reads a first data signal and outputs a third clock signal and a second data signal to the physical layer chip; under drive of the first clock signal, the physical layer chip processes the third clock signal and the second data signal and outputs a serial low voltage differential data signal and a serial low voltage differential clock signal of which a phase difference relative to the serial low voltage differential data signal is within a preset range, such that a phase difference between the serial low voltage differential data signal and the serial low voltage differential clock signal meets requirements, it is ensured that the data signal and the clock signal are synchronous, and the clock offset is improved; since only one phase-locked loop is used to generate the clock signal, the design can be simplified, hardware resource and cost are saved, the circuit size is reduced, and power consumption can be lowered.

BRIEF DESCRIPTION OF THE DRAWINGS

In order to describe the technical solutions in the embodiments of the present disclosure more clearly, the following will briefly introduce the accompanying drawings required for describing the embodiments. Apparently, the accompanying drawings in the following description show merely some embodiments of the present disclosure, and one of ordinary skill in the art may still derive other drawings from these accompanying drawings without creative efforts. In the drawings.

DETAILED DESCRIPTION

A clear and complete description of the technical solutions in the embodiments of the present disclosure will be made below with reference to the accompanying drawings in the embodiments of the present disclosure. Apparently, the embodiments as recited herein are merely some embodiments of the present disclosure instead of all embodiments. All other embodiments obtained by one of ordinary skill in the art based on the embodiments of the present disclosure without creative efforts shall fall within the protection scope of the present disclosure.

Figure 1:
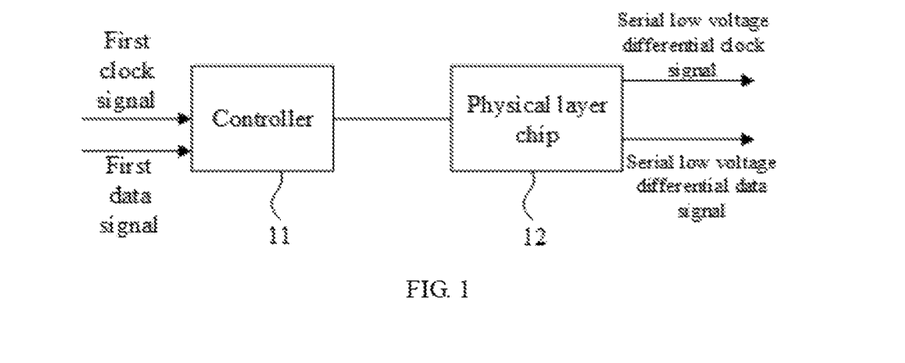
FIG. 1 is a structural schematic view of a first embodiment of a low voltage differential signal transmitter provided by the present disclosure.

Referring to FIG. 1, FIG. 1 is a structural schematic view of a first embodiment of a low voltage differential signal transmitter provided by the present disclosure, the low voltage differential signal transmitter comprises a controller 11 and a physical layer chip 12.

The controller 11 is configured to receive a first clock signal, process the first clock signal to obtain a second clock signal, read the first data signal under drive of the second clock signal, and output a third clock signal and a second data signal.

The first clock signal is a clock signal output by an external phase-locked loop, the external phase-locked loop receives an input clock signal, traces the input clock signal, and outputs a clock signal of which a phase difference relative to the input clock signal keeps constant; the controller 11 can perform a frequency division process for the first clock signal, that is, a frequency of the second clock signal is lower than a frequency of the first clock signal; the first data signal can be a control signal or an RGB (red, green, blue) signal output by a graphic processor, and the first data signal is a parallel signal.

The physical layer chip 12 is configured to receive the first clock signal, it is connected with the controller 11, and can also be used to receive signals output by the controller 11, sample the third clock signal and the second data signal using the first clock signal, and output serial low voltage differential clock signal and data signal; wherein, a phase difference between the serial low voltage differential clock signal and the serial low voltage differential data signal is within a preset range.

The physical layer chip 12 is configured to receive the third clock signal and the second data signal output by the controller 11, convert the second data signal into a serial data signal under drive of the first clock signal, and further convert the serial data signal into a serial low voltage differential data signal; at the same time, the third clock signal input into the physical layer chip 12 can be sampled by the first clock signal and generate a serial low voltage differential clock signal.

One phase-locked loop is utilized to generate a clock signal, the third clock signal output by the controller 11 is sampled and output as a special data, and under drive of the first clock signal, the physical layer chip 12 is utilized to process the third clock signal and the second data signal output by the controller 11; since the third clock signal and the second data signal are sampled at the same time by the same clock signal, a phase difference between an output serial low voltage differential clock signal and an output serial low voltage differential data signal is within a preset range, synchronization between the data signal and the clock signal is ensured, and the clock offset index is improved. Compared with the prior art that requires using two phase-locked loops, since the present embodiment removes a phase-locked loop in the physical layer chip, the design is simplified, hardware cost and space are saved, and it is conducive to reduce power consumption.

This embodiment provides the low voltage differential signal transmitter, the low voltage differential signal transmitter comprises the controller 11 and the physical layer chip 12 connected with each other; the controller 11 is utilized to process the received first clock signal to obtain the second clock signal; under drive of the second clock signal, the controller 11 reads the first data signal and output the third clock signal and the second data signal to the physical layer chip 12; and under drive of the first clock signal, the physical layer chip 12 processes third clock signal and the second data signal, outputs the serial low voltage differential data signal and the serial low voltage differential clock signal of which a phase difference relative to the serial low voltage differential data signal is within a preset range, such that a phase difference between the serial low voltage differential data signal and the serial low voltage differential clock signal meets requirements, it is ensured that the data signal and the clock signal are synchronous, and the clock offset is improved.

Figure 2:
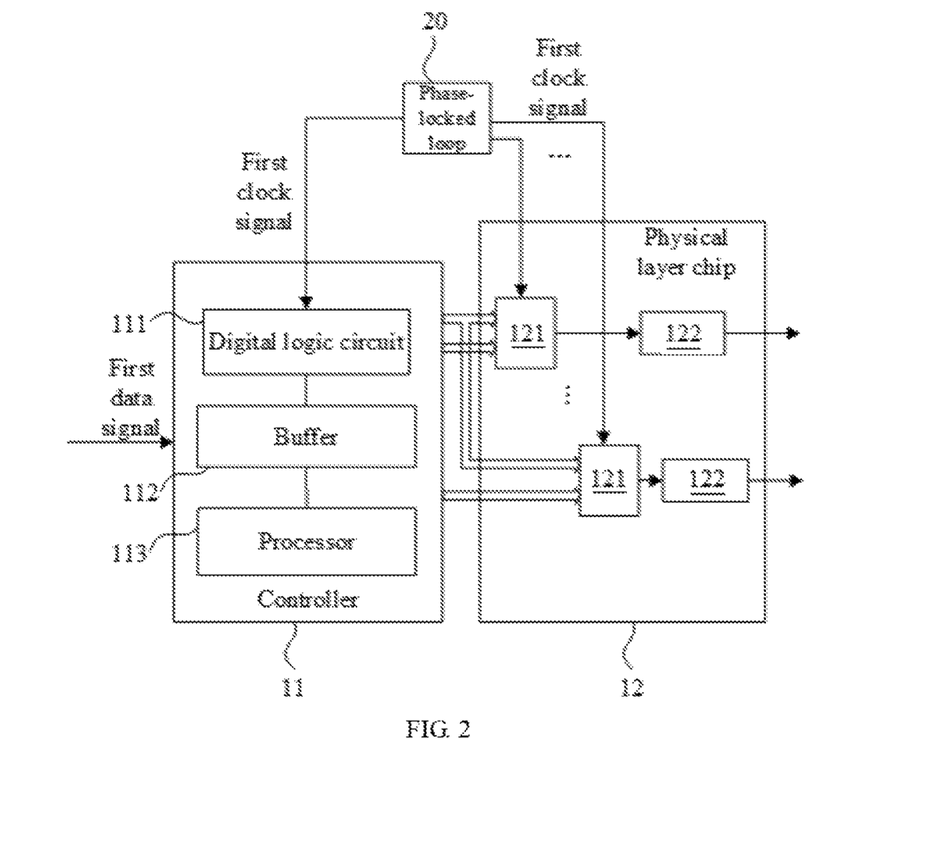
FIG. 2 is a structural schematic view of a second embodiment of a low voltage differential signal transmitter provided by the present disclosure.

Referring to FIG. 2, FIG. 2 is a structural schematic view of a second embodiment of a low voltage differential signal transmitter provided by the present disclosure. The low voltage differential signal transmitter comprises a controller 11 and a physical layer chip 12.

The controller 11 is configured to receive a first clock signal, process the first clock signal to obtain a second clock signal, read the first data signal under drive of the second clock signal, and outputs a third clock signal and a second data signal.

The first clock signal can be a sampling clock signal, and the first clock signal can be a signal formed by spreading a spectrum of a preset clock signal; the second clock signal can be a pixel clock signal; the third clock signal and a serial low voltage differential clock signal have the same frequency and the same duty cycle; the first data signal is a signal output by an external graphic processor, which includes a red data signal R, a green data signal G and a blue data signal B.

In a specific embodiment, the controller 11 can perform a mapping process for RGB888 data (8 bit red data signal R, 8 bit green data signal G 8 bit blue data signal B) output by a pre-class graphic processor to meet LVDS format requirements, and can also implement debug functions such as exchanging data lines; the third clock signal is a constant clock string, and its binary representation is 1100011; with respect to a single link, one constant clock string is required; with respect to dual links, two constant clock strings are required; with respect to four links, four constant clock strings are required.

The controller 11 is further configured to receive a control signal output by an external graphic processor, and perform a mapping process for the first data signal under control of the control signal to generate the second data signal.

Further, the controller 11 includes a digital logic circuit 111, a buffer 112, and a processor 113 connected in sequence, the digital logic circuit 111 includes a frequency divider 1111, the frequency divider 1111 is configured to attenuate the frequency of the first clock signal by a preset proportion to obtain the second clock signal.

The buffer 112 is configured to match an output speed of the first data signal with a speed of reading the first data signal by the controller 11, and store the first data signal; with respect to a single link, an output frequency of the first data signal is equal to a frequency of the second clock signal; with respect to dual links, an output frequency of the first data signal is equal to twice a frequency of the second clock signal. The buffer 112 is configured to perform data transmission synchronization between the graphic processor and the controller 11, the buffer 112 stores the first data signal temporarily, so as to facilitate reading by the controller 11 and prevent occurrence of data missing caused by data mismatch.

The processor 113 is configured to output an effective output signal with a high electric level to the digital logic circuit 111 when detecting that the buffer 112 stores the first data signal, such that the digital logic circuit 111 outputs the second data signal and the third clock signal.

The physical layer chip 12 is connected with the controller 11, it is configured to receive the first clock signal and the signals output by the controller 11, sample the third clock signal and the second data signal using the first clock signal, and output serial low voltage differential clock signal and data signal; wherein, a phase difference between the serial low voltage differential clock signal and the serial low voltage differential data signal is within a preset range.

Further, the physical layer chip 12 includes a plurality of serializer 121 and a plurality of driver 122, each serializer 121 samples the second data signal or the third clock signal according to the first clock signal, and serializes the second data signal and the third clock signal to obtain a serial data signal. In a specific embodiment, when performing single link transmission, one serializer 121 is configured to receive the first clock signal and the third clock signal at the same time, and the other serializers 121 are configured to receive the first clock signal and the second data signal at the same time; when performing dual link transmission, two serializers 121 are configured to receive the first clock signal and the third clock signal at the same time, and the other serializers 121 are configured to receive the first clock signal and the second data signal at the same time.

The number of the drivers 122 is equal to the number of the serializer 121, each driver 122 is connected with one serializer 121, the driver 122 is configured to process data output by the serializer 121 to obtain serial low voltage differential data signals.

The digital logic circuit 111 is further configured to output a loading signal with a high electric level to each serializer 121 when an effective output signal is at a high electric level and the time of receiving the second data signal is a preset multiple of the period of the first clock signal, wherein the duration time of the loading signal with a high electric level is an integer multiple of a preset period, such that the second data signal and the third clock signal are latched. In a specific embodiment, duration time of the loading signal with a high electric level is equal to a period of the first clock signal.

Figure 3:
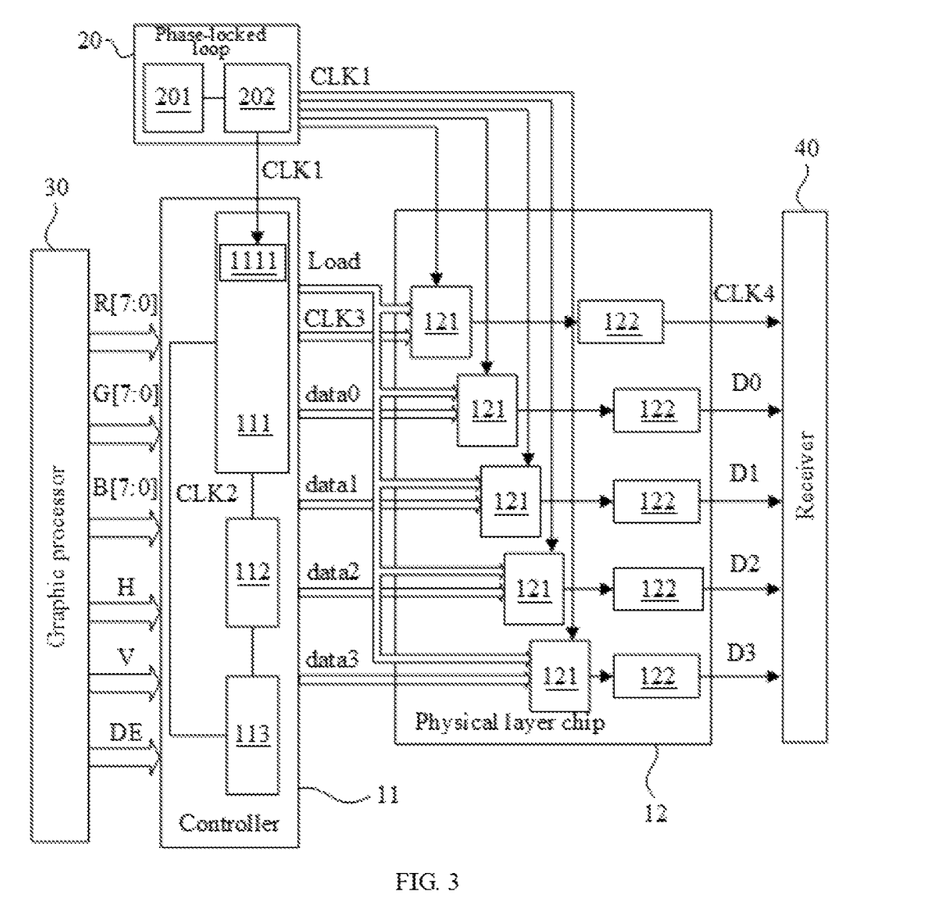
FIG. 3 is a structural schematic view of a third embodiment of a low voltage differential signal transmitter provided by the present disclosure.

In a specific embodiment, a single link low voltage differential signal transmitter is as shown in FIG. 3. A first data signal output by a graphic processor 30 is an RGB signal, which is 8 bit data: R[7:0], G[7:0], and B[7:0]; a second data signal including four pieces of 7 bit data data0-data3; a control signal output by the graphic processor 30 includes a horizontal scanning signal H, a vertical scanning signal V, and a data enabling signal DE.

A frequency of a sampling clock signal CLK1 output by a phase-locked loop 20 is seven times that of a pixel clock signal CLK2. The sampling clock signal is generated by frequency doubling for a system clock signal output by a crystal oscillator 201 in the phase-locked loop 20, as shown in FIG. 3, a frequency doubling circuit 202 performs a frequency doubling process for the system clock signal output by the crystal oscillator, and generates the sampling clock signal CLK1; in a specific embodiment, a frequency of the system clock signal is 27 MHz; the frequency divider 1111 performs a frequency division process for the sampling clock signal CLK1, and obtains the pixel clock signal CLK2.

Figure 4:
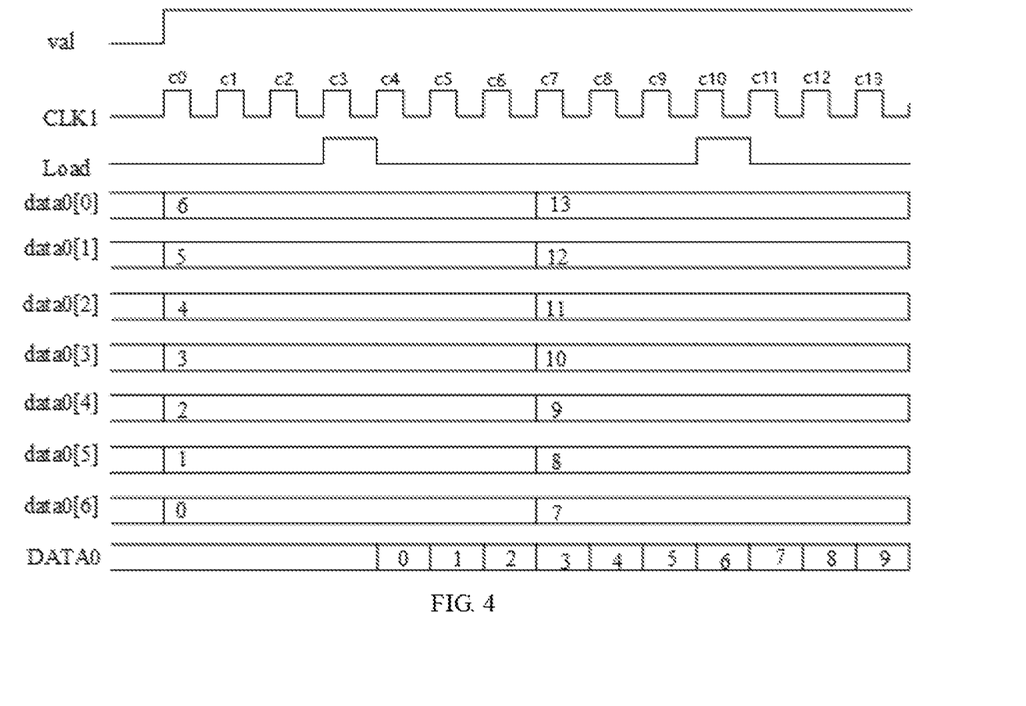
FIG. 4 is a time sequential schematic view of circuit corresponding to FIG. 3.

The pixel clock signal CLK2 is configured to control the buffer 112 in the controller 11 to read the first data signal from the front end graphic processor 30. When the buffer 112 stores the first data signal, an effective output signal val is at a high electric level; when the effective output signal val is at a high electric level, and data has stabilized for three sampling clock periods during one pixel clock period, the loading signal Load is pulled up and continues for one sampling clock period, as shown in the time sequence chart of FIG. 4; afterwards, in each pixel clock period there will be a rising edge of the loading signal Load, which can be used to latch parallel data. As shown in FIG. 4, in a specially preferred embodiment, the buffer 112 can utilize the pixel clock signal CLK2 to read the first data signal from the graphic processor 30. A preset number of pulses of the sampling clock signal CLK1 (each pulse of the sampling clock signal CLK1 can be regarded as one sampling clock period) can be configured to correspond to one period of the pixel clock signal CLK2 (i.e., one pixel clock period), for example, as shown in FIG. 4, every seven pulses (i.e., c0-c6, c7-c13, etc.) of the sampling clock signal CLK1 correspond to one period of the pixel clock signal CLK2. In other words, a preset number of, such as seven, sampling clock periods are defined as one pixel clock period. In one period of the pixel clock signal CLK2, data of one pixel is transmitted by the signal lines data0[0]-data0[6]. The serializer 121 can count the pulses of the sampling clock signal CLK1 during every period of the pixel clock signal CLK2; when a rising edge of a predetermined pulse of the sampling clock signal CLK1 is counted (for example, as shown in FIG. 4, when the a rising edge of the fourth pulse c3 of the sampling clock signal CLK1 is counted, that is, when a predetermined, such as the fourth, sampling clock period starts), a Load signal can be pulled-up and kept being pulled-up for at least one sampling clock period; in this sampling clock period, parallel data in the signal lines data0[0]-data0[6] are latched. In this way, the parallel data has been stabilized for a plurality of (for example, three) sampling clock period periods when it is latched, and will continue to stabilize for a plurality of (for example, three) sampling clock period periods after the Load signal is pulled-down, such that the sampled data is stable and accurate. Furthermore, after the Load signal has been pulled-up, when a rising edge of a pulse of a next sampling clock signal CLK1 is counted (for example, as shown in FIG. 4, when the a rising edge of the fifth pulse c4 of the sampling clock signal CLK1 is counted), data in the signal line data0[6] can be transferred to serial data DATA0 and used as a first serialized output bit; similarly, at rising edges of the pulses c5-c0, data in the signal lines data0[5]-data0[0] are respectively and sequentially transferred to serial data DATA0, such that 7 bits of parallel data of the pixel of which the data is transmitted by the signal lines data0[0]-data0[6] are serialized and output to DATA0. Afterwards, in every pixel clock period, that is, in every seven sampling clock periods (for example, c7-c13, possible c14-c21, etc.), there will be a Load high electric level maintaining for a sampling lock period for latching data.

The serializer 121 directly utilizes a clock signal output by an external phase-locked loop 20 as a sampling clock, which is configured to perform serialization processes for the constant clock string 1100011 and data0[6:0]-data3[6:0] output by the controller 11 at the same time. For example, as shown in FIG. 4, the serializer 121 processes parallel data data0[6:0], latches 7 bit parallel data at each rising edge of the loading signal Load, and then obtains serial data DATA0; finally, through process of the driver 122, serial differential signals D0-D3 meeting the LVDS protocol standard are output to the receiver 40.

Figure 5:
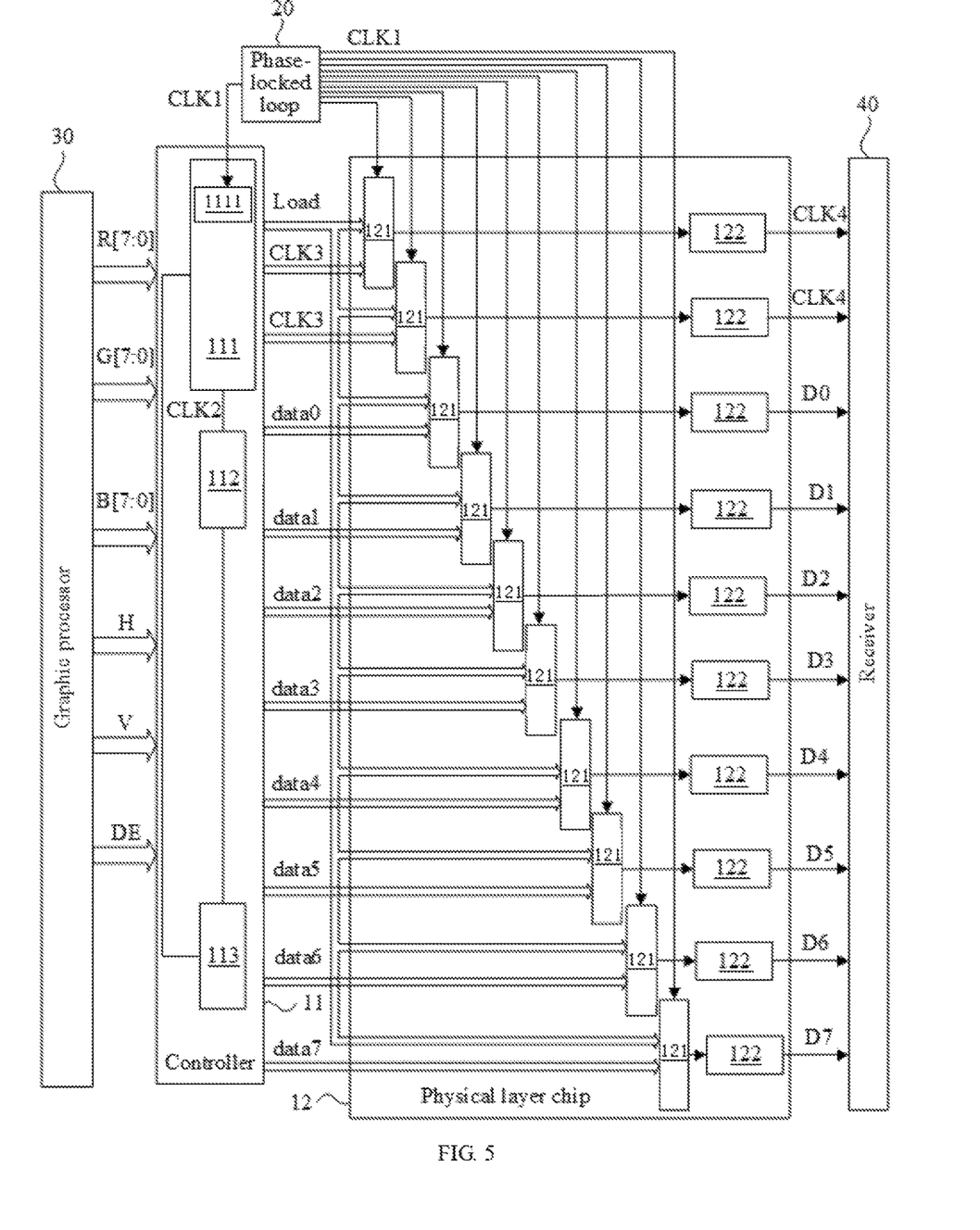
FIG. 5 is a structural schematic view of a fourth embodiment of a low voltage differential signal transmitter provided by the present disclosure.

A dual-link low voltage differential signal transmitter is as shown in FIG. 5. Different from a single link, dual links need two third clock signal CLK3, the second data signal includes eight pieces of 7 bit data data-data7, the physical layer chip 12 includes ten serializes and ten drivers, and outputs two fourth clock signals CLK4 and eight serial differential signals D0-D7; its working principle is similar to that of the single link low voltage differential signal transmitter, and is not repeated here.

Figure 6:
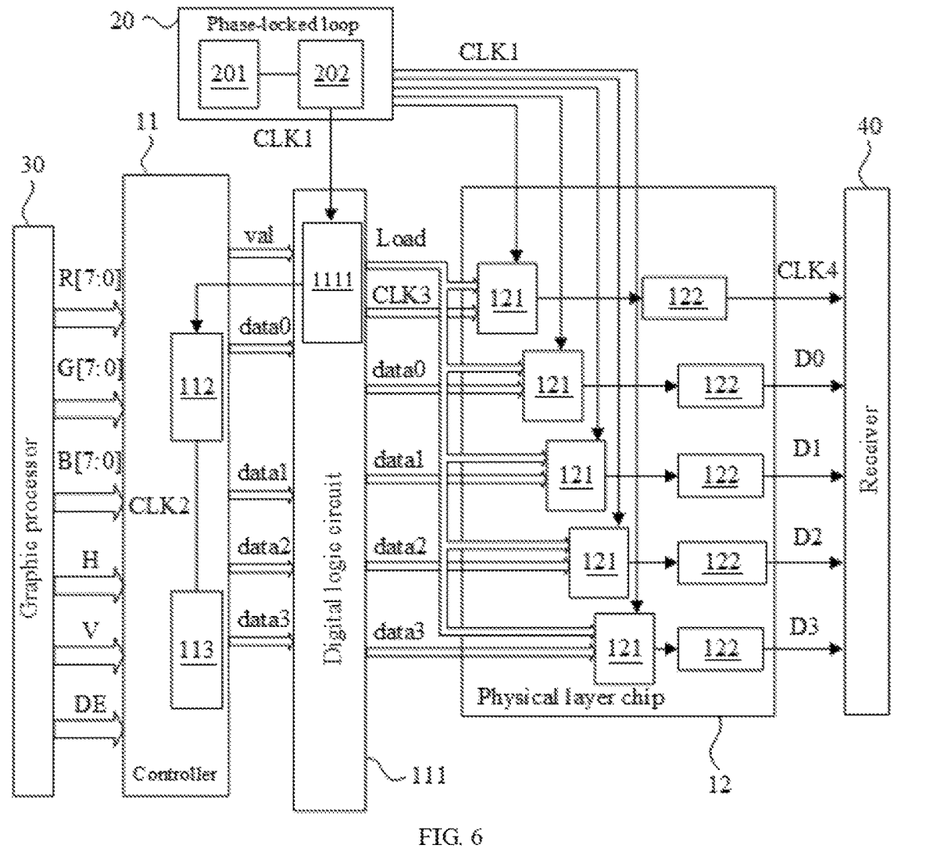
FIG. 6 is a structural schematic view of a fifth embodiment of a low voltage differential signal transmitter provided by the present disclosure.

In other embodiment, it is also possible that the digital logic circuit 111 is independent, that is, a digital logic circuit 111 is added between the controller 11 and the physical layer chip 12, as shown in FIG. 6. Specific functions of the circuit are similar to that of the above embodiments, and are not repeated here.

During each period corresponding to the pixel clock signal, data is latched after the data has stabilized for three sampling clock periods, and the data will further stabilize for three sampling clock periods after the parallel data is loaded, such that the data has already stabilized when latching the parallel data, thereby realizing stabilized transmission of data. Since the third clock signal and the second data signal output by the controller 11 are sampled at the same time by the same clock, they pass through an identical path, there is no phase difference, and synchronization is ensured; when the sampling clock signal output by the phase-locked loop 20 is spread in frequency, following performance of the physical layer chip 12 for the clock signal with a spread frequency is also ensured; the value of the constant clock string is 110011, the duty cycle is 4/7, and the duty cycle of the finally output fourth clock signal is also 4/7, the serial low voltage differential clock signal does not require any special process, a clock signal meeting output requirements can be obtained, since the sampling clock signal directly comes from an external phase-locked loop 20, compared with the prior art, the phase-locked loop 20 in the physical layer chip 12 can be removed, the design can be simplified, the power consumption can be lowered, and the size of the naked chip can be reduced.

The present disclosure further provides a method for generating a low voltage differential signal. A method for generating a low voltage differential signal according to an exemplary embodiment of the present disclosure comprises: receiving a first clock signal; processing the first clock signal to obtain a second clock signal; reading a first data signal under drive of the second clock signal; outputting a third clock signal and a second data signal; sampling the third clock signal and the second data signal according to the first clock signal; and outputting a serial low voltage differential clock signal and a serial low voltage differential data signal.

Figure 7:
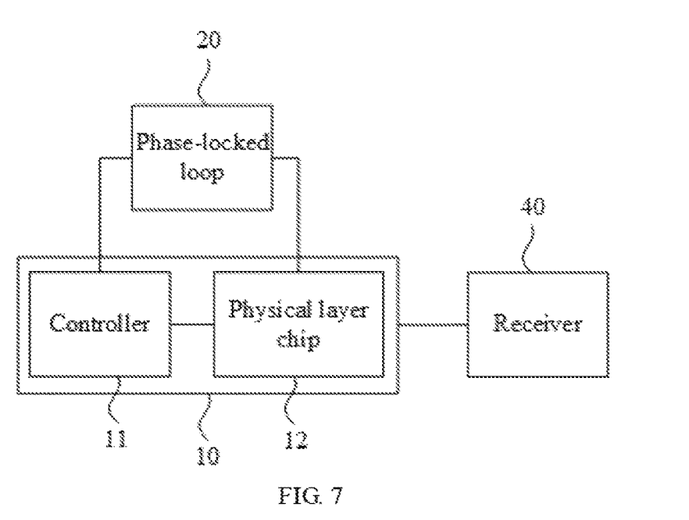
FIG. 7 is a structural schematic view of an embodiment of a data transmission device provided by the present disclosure.

Referring to FIG. 7, FIG. 7 is a structural schematic view of an embodiment of a data transmission device provided by the present disclosure, the data transmission device comprises: a phase-locked loop 20, a low voltage differential signal transmitter 10, and a receiver 40.

The phase-locked loop 20 is configured to generate a first clock signal; the low voltage differential signal transmitter 10 is connected with the phase-locked loop 20 and includes a controller 11 and a physical layer chip 12 connected with each other.

The controller 11 is configured to receive the first clock signal, process the first clock signal to obtain a second clock signal, read a first data signal under drive of the second clock signal, and output a third clock signal and a second data signal.

The physical layer chip 12 is configured to receive the first clock signal and the signals output by the controller 11, sample the third clock signal and the second data signal according to the first clock signal, and output a serial low voltage differential clock signal and a serial low voltage differential data signal; wherein, a phase difference between the serial low voltage differential clock signal and the serial low voltage differential data signal is within a preset range.

The receiver 40 is connected with the low voltage differential signal transmitter 10 and configured to receive the serial low voltage differential clock signal and data signal.

One phase-locked loop 20 is utilized to generate the first clock signal, the first clock signal can sample the third clock signal and the second data signal output by the controller 11, such that a phase difference between the serial low voltage differential data signal and the serial low voltage differential clock signal output by the physical layer chip 12 meets requirements, it is ensured that the data signal and the clock signal are synchronous, and the clock offset is improved; since only one phase-locked loop 20 is utilized to generate the clock signal, the design can be simplified, hardware resource and cost are saved, the size of the data transmission device is reduced, and power consumption is lowered.

The above are only the embodiments of the present disclosure, and thus do not limit the patent scope of the present disclosure. Equivalent structure or equivalent process transformations made by the contents of the specification and the drawings of the present disclosure, or directly or indirectly applications in other related technical fields, are all similarly included in the patent protection scope of the present disclosure.

What is claimed is:

1. A low voltage differential signal transmitter, comprising:
   a controller configured to receive a first clock signal, process the first clock signal to obtain a second clock signal, read a first data signal under drive of the second clock signal, and output a third clock signal and a second data signal;
   a physical layer chip configured to receive the first clock signal, wherein, the physical layer chip is connected with the controller to receive the signals output by the controller, samples the third clock signal and the second data signal according to the first clock signal, and outputs a serial low voltage differential clock signal and a serial low voltage differential data signal; and
   a digital logic circuit, wherein, the digital logic circuit includes a frequency divider, the frequency divider is configured to attenuate a frequency of the first clock signal by a preset proportion to obtain the second clock signal; the controller includes a buffer and a processor connected with each other, the buffer is connected with the digital logic circuit, and the buffer is configured to match an output speed of the first data signal with a speed of reading the first data signal by the controller and store the first data signal; the processor is configured to output an effective output signal with a high electric level to the digital logic circuit when detecting that the buffer stores the first data signal, such that the digital logic circuit outputs the second data signal and the third clock signal.

2. The low voltage differential signal transmitter according to claim 1, wherein, the digital logic circuit is included in the controller.

3. The low voltage differential signal transmitter according to claim 1, wherein, the physical layer chip includes a plurality of serializers, each of the serializers samples the second data signal or the third clock signal according to the first clock signal, and serialize the second data signal or the third clock signal to obtain a serial data signal.

4. The low voltage differential signal transmitter according to claim 3, wherein, the digital logic circuit is further configured to output a loading signal with a high electric level to each serializer when the effective output signal is at a high electric level and the time of receiving the second data signal is a preset multiple of the period of the first clock signal, and the duration time of the loading signal with a high electric level is an integer multiple of a preset period, such that the second data signal and the third clock signal are latched.

5. The low voltage differential signal transmitter according to claim 1, wherein, the low voltage differential signal transmitter further comprises a plurality of drivers, the number of the drivers is equal to the number of the serializers, each of the drivers is connected with one of the serializers and configured to process data output by the serializer to obtain the serial low voltage differential data signal.

6. The low voltage differential signal transmitter according to claim 1, wherein, the first data signal is a signal output by an external graphic processor; the controller is further configured to receive a control signal output by the external graphic processor, and perform a mapping process for the first data signal under control of the control signal to generate the second data signal.

7. The low voltage differential signal transmitter according to claim 1, wherein, the first clock signal is a sampling clock signal, the sampling clock signal is generated by frequency doubling for a system clock signal output by a crystal oscillator in the phase-locked loop, and the second clock signal is a pixel clock signal.

8. The low voltage differential signal transmitter according to claim 7, wherein, the third clock signal and a serial low voltage differential clock signal have the same frequency and the same duty cycle.

9. The low voltage differential signal transmitter according to claim 1, wherein, the third clock signal and the second data signal are sampled at the same time by the same clock.

10. The low voltage differential signal transmitter according to claim 1, wherein, the physical layer chip includes no phase-locked loop.

11. A method for generating a low voltage differential signal, comprising:
    receiving a first clock signal;
    processing the first clock signal to obtain a second clock signal, reading a first data signal under drive of the second clock signal, and outputting a third clock signal and a second data signal;
    sampling the third clock signal and the second data signal according to the first clock signal; outputting a serial low voltage differential clock signal and a serial low voltage differential data signal;
    wherein, the second clock signal is obtained by attenuating a frequency of the first clock signal by a preset proportion; and the second data signal and the third clock signal are generated by operations of: matching an output speed of the first data signal with a speed of reading the first data signal and storing the first data signal; outputting an effective output signal with a high electric level when detecting that the first data signal is stored; and outputting the second data signal and the third clock signal in response to the effective output signal.

12. The method according to claim 11, further comprising:
    defining a preset number of sampling clock periods as one pixel clock period;
    during each pixel clock period, when a predetermined sampling clock period starts, pulling-up a Load signal and keeping the pulled-up Load signal for one sampling clock period; and
    latching data during the sampling clock period when the pulled-up Load signal is kept.

13. A data transmission device, comprising:
    a phase-locked loop configured to generate a first clock signal;
    a low voltage differential signal transmitter connected with the phase-locked loop and including a controller and a physical layer chip connected with each other; wherein, the controller is configured to receive the first clock signal, process the first clock signal to obtain a second clock signal, read a first data signal under drive of the second clock signal, and output a third clock signal and a second data signal; the physical layer chip is configured to receive the first clock signal and the signals output by the controller, sample the third clock signal and the second data signal according to the first clock signal, and output a serial low voltage differential clock signal and a serial low voltage differential data signal; and a receiver connected with the low voltage differential signal transmitter and configured to receive the serial low voltage differential data signal and the serial low voltage differential clock signal;

wherein, the low voltage differential signal transmitter further comprises a digital logic circuit, the digital logic circuit includes a frequency divider, the frequency divider is configured to attenuate a frequency of the first clock signal by a preset proportion to obtain the second clock signal; the controller includes a buffer and a processor connected with each other, the buffer is connected with the digital logic circuit, and the buffer is configured to match an output speed of the first data signal with a speed of reading the first data signal by the controller and store the first data signal; the processor is configured to output an effective output signal with a high electric level to the digital logic circuit when detecting that the buffer stores the first data signal, such that the digital logic circuit outputs the second data signal and the third clock signal.

14. The data transmission device according to claim 13, wherein, the physical layer chip includes no phase-locked loop.

* * * * *